(12) United States Patent
Hoshijima

(10) Patent No.: US 7,450,976 B2
(45) Date of Patent: Nov. 11, 2008

(54) PORTABLE ELECTRONIC DEVICE

(75) Inventor: Toshiyuki Hoshijima, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 630 days.

(21) Appl. No.: 11/115,404

(22) Filed: Apr. 27, 2005

(65) Prior Publication Data

US 2005/0277450 A1    Dec. 15, 2005

(30) Foreign Application Priority Data

Apr. 28, 2004    (JP)    ............... 2004-132967

(51) Int. Cl.
*H04M 1/00*    (2006.01)
(52) U.S. Cl. .............. 455/575.1; 455/90.3; 455/95; 455/347; 455/350; 381/423; 381/345; 381/395; 181/157; 181/163
(58) Field of Classification Search ............. 455/575.1, 455/550.1, 90.3, 95, 340, 347, 350; 381/423, 381/424, 398, 397, 189, 396, 351, 345, 365; 264/328.12, 328.1, 328.8; 181/150, 175, 181/163–167, 173, 174, 157
See application file for complete search history.

(56) References Cited

U.S. PATENT DOCUMENTS 5,690,886 A * 11/1997 Kurihara ................. 264/328.12
5,838,809 A * 11/1998 Sato et al. .................... 381/409
6,454,046 B1 * 9/2002 Chuang ....................... 181/167
2005/0201588 A1 * 9/2005 Funahashi et al. ............ 381/423
2006/0088181 A1 * 4/2006 Kaiya et al. .................. 381/398

FOREIGN PATENT DOCUMENTS

| JP | 05104568 A | * | 4/1993 |
| JP | 407284194 A | * | 10/1995 |
| JP | 2806847 | | 7/1998 |
| JP | 11004493 A | * | 1/1999 |
| JP | 2002141987 A | * | 5/2002 |
| JP | 2004180073 A | * | 6/2004 |
| JP | 2006174004 A | * | 6/2006 |

\* cited by examiner

*Primary Examiner*—Sujatha Sharma
(74) *Attorney, Agent, or Firm*—Westerman, Hattori, Daniels & Adrian, LLP.

(57) ABSTRACT

A portable electronic device of the present invention includes a cabinet and a speaker placed inside the cabinet. The cabinet has one or more sound radiating holes in an area opposed to a front face of the speaker. A dustproof plate formed by attaching a dustproof net and a reinforcing sheet to each other is placed on the front face of the speaker or an inner face of the cabinet opposed to the front face. The reinforcing sheet has a plurality of openings formed for passing through sound waves from the speaker.

2 Claims, 3 Drawing Sheets

PORTABLE ELECTRONIC DEVICE

BACKGROUND OF THE INVENTION

1. Field of the Invention

The present invention relates to a portable electronic device such as a portable telephone having a speaker placed inside a cabinet.

2. Description of Related Art

Conventional portable telephones have a speaker for radiating incoming sound and voice from a telephoning partner and placed in a cabinet. A plurality of sound radiating holes for passing through sound waves from the speaker are provided in an area opposed to a front face of the speaker in the cabinet. A dustproof net is placed inside the cabinet in close contact with the front face of the speaker to prevent dust from entering into the speaker.

Recent portable telephones have been provided with hands-free function, which allows being on the telephone with a cabinet away from ears, for example, on a desk. A large output speaker is mounted in such a portable telephone.

In the portable telephones, sound of the speaker causes air to enter and exit through the sound radiating holes of the cabinet. Because the dustproof net is formed from nonwoven fabric or the like and has large flow resistance when air passes therethrough, the dustproof net vibrates as air enters and exits therethrough, and repeats clashes against the front face of the speaker, to thereby cause a problem of occurrence of rattle sound. This problem becomes significant particularly in the case of a large output speaker.

When the dustproof net is attached in close contact with an inner face of the cabinet, the dustproof net also repeats clashes against the inner face of the cabinet to thereby cause the problem of occurrence of rattle sound.

Accordingly, it has been proposed that when the dustproof net is attached in close contact with the inner face of the cabinet, a projection for pushing up the middle of the dustproof net is formed on the inner face of the cabinet to provide space between the inner face of the cabinet and the dustproof net, to thereby suppress occurrence of rattle sound (JP 2806847 B).

However, in the above-described conventional structure, there has been a problem of a complicated mold structure because the projection needs to be formed on the inner face of the cabinet.

SUMMARY OF THE INVENTION

Accordingly, an object of the present invention is to provide a portable electronic device adapted to effectively suppress occurrence of rattle sound due to vibration of a dustproof net with easy construction without changing a structure of a cabinet.

A portable electronic device of the present invention includes a cabinet 1 and a speaker 4 placed inside the cabinet 1. The cabinet 1 has one or more sound radiating holes 21 in an area opposed to a front face of the speaker 4. A dustproof plate 5 formed by attaching together a dustproof net 51 to a reinforcing sheet 52 is placed on the front face of the speaker 4 or an inner face of the cabinet 1 opposed to the front face. The reinforcing sheet 52 has a plurality of openings 54 formed for passing through sound waves from the speaker 4.

Specifically, the reinforcing sheet 52 is made of synthetic resin, and has the plurality of openings 54 formed surrounding the middle thereof.

In the above-described portable electronic device of the present invention, the reinforcing sheet 52 is attached to the dustproof net 51, which can be easily bent deformed, to provide the dustproof plate 5 having larger rigidity (resistance against bent deformation) as a whole than that of the dustproof net 51, to be placed between the cabinet 1 and the speaker 4. Therefore, the dustproof plate 5 hardly vibrates even if subjected to excitation force when the speaker 4 sounds, to thereby suppress occurrence of rattle sound.

The reinforcing sheet 52 of the dustproof plate 5 has the plurality of openings 54 formed for passing through sound waves from the speaker 4, and therefore radiation of sound waves from the speaker 4 is not prevented.

Here, there is no adverse effect on output characteristics if a total area of the plurality of openings 54 formed on the reinforcing sheet 52 is larger than a total opening area of the one or more sound radiating holes 21 provided in the cabinet 1.

As described above, according to the portable electronic device of the present invention, occurrence of rattle sound due to vibration of the dustproof net can be effectively suppressed with easy construction without changing a structure of the cabinet by only attaching the reinforcing sheet to the dustproof net.

DETAILED DESCRIPTION OF THE INVENTION

Figure 1:
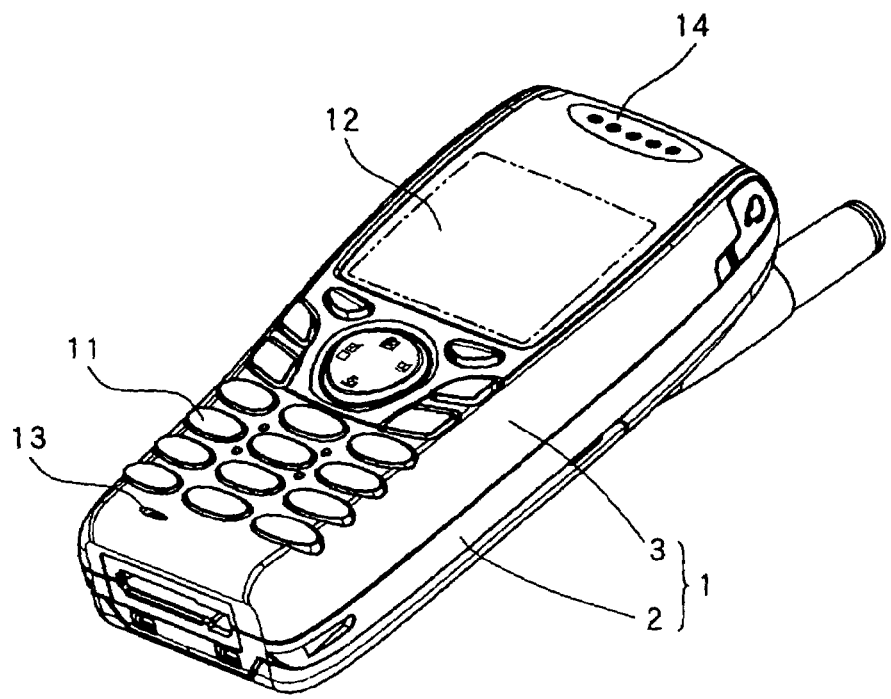
FIG. 1 is a perspective view showing a front face of a portable telephone of the present invention.

The present invention as embodied into a portable telephone will be described below in detail with reference to the drawings. As shown in FIG. 1, the portable telephone of the present invention includes a flat cabinet 1 including a rear cabinet segment 2 and a front cabinet segment 3. The front cabinet segment 3 has a plurality of manual keys 11 and a display 12. A transmitter 13 is provided at a lower end portion of the front cabinet segment 3, and a receiver 14 is provided at an upper end portion of the front cabinet segment 3.

Figure 2:
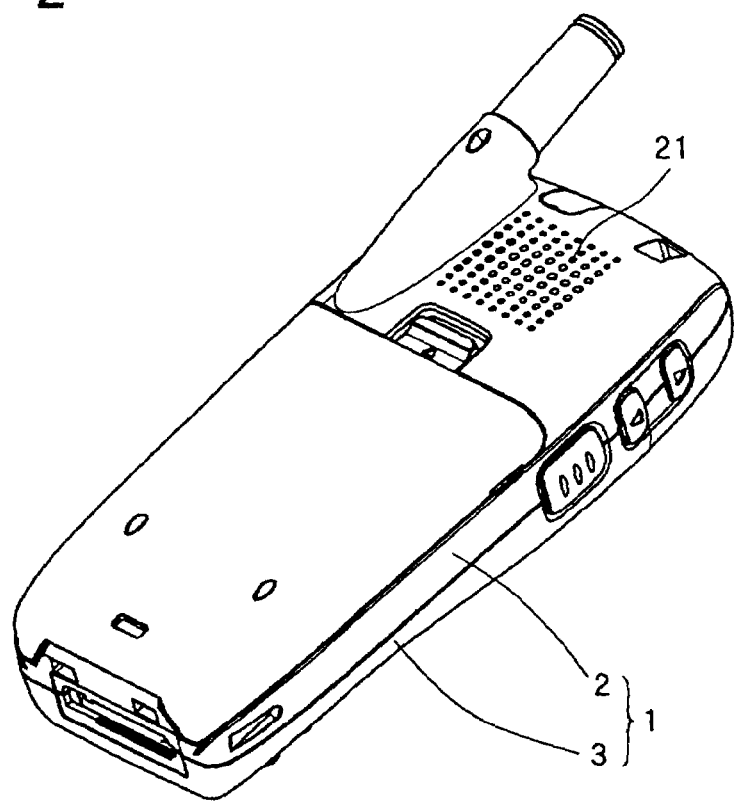
FIG. 2 is a perspective view showing a rear face of the portable telephone.

As shown in FIG. 2, the rear cabinet segment 2 has a plurality of sound radiating holes 21 for radiating voice of a partner during a telephone call using hands-free function and melody etc. for notifying various incoming signals.

Figure 3:
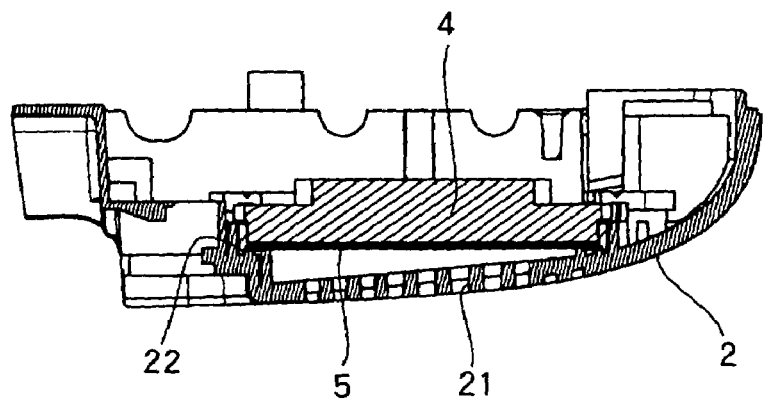
FIG. 3 is a sectional view showing a mount structure of a speaker and a dustproof plate on a rear cabinet segment.

As shown in FIG. 3, inside the rear cabinet segment 2, a large output speaker 4 for radiating ringer melody and partner voice during a hands-free telephone call is placed facing the sound radiating holes 21 of the rear cabinet segment 2. A dustproof plate 5 is placed on a front face of the speaker 4.

Figure 5:
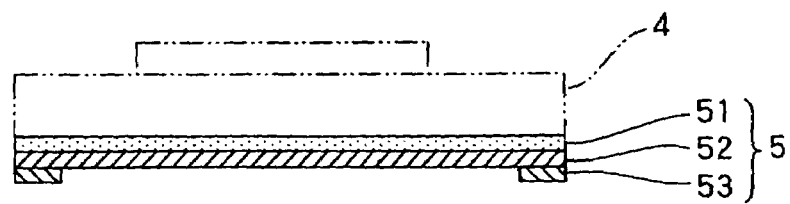
FIG. 5 is an enlarged sectional view of the dustproof plate.

As shown in FIG. 5, the dustproof plate 5 includes a dustproof net 51 formed from nonwoven fabric as conventionally, a reinforcing sheet 52 made of PET with a thickness of approximately 0.1 mm attached to the dustproof net 51, and a ring-shaped two-sided adhesive tape 53 attached to an outer periphery of the reinforcing sheet 52.

Figure 6:
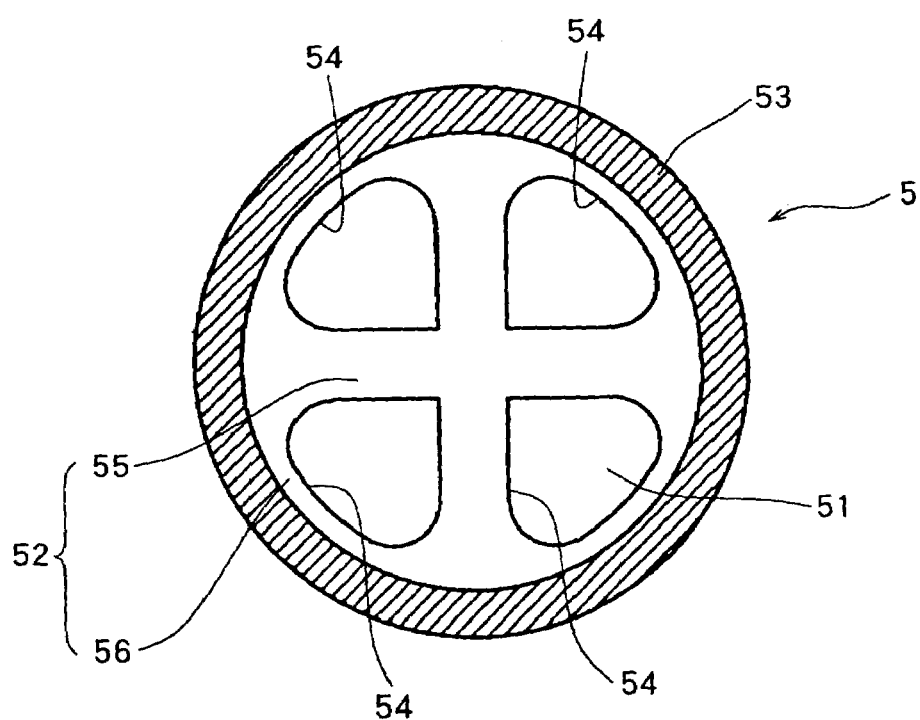
FIG. 6 is an enlarged back view of the dustproof plate.

As shown in FIG. 6, the reinforcing sheet 52 of the dustproof plate 5 includes a cross arm portion 55 and an outer periphery ring portion 56, having four openings 54 formed in a circle. The adhesive tape 53 is attached to the outer periphery ring portion 56 of the reinforcing sheet 52. The four openings 54 of the dustproof net 51 have a larger total opening area than a total opening area of the plurality of sound radiating holes 21 of the rear cabinet segment 2.

Figure 4:
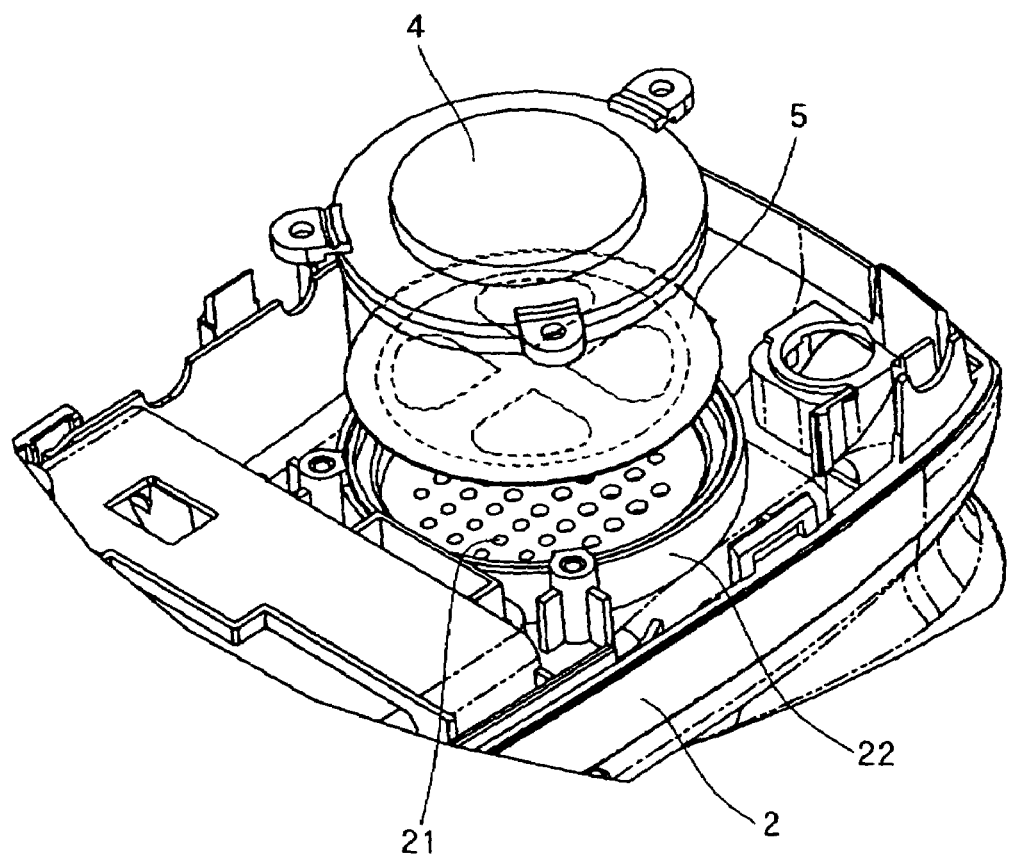
FIG. 4 is an exploded perspective view showing the above structure.

As shown in FIG. 4, a cylindrical rib 22 having a slightly larger inner diameter than an outer diameter of the speaker 4 is projected inside the rear cabinet segment 2. The plurality of sound radiating holes 21 are provided in an inner area of the cylindrical rib 22.

The dustproof plate 5 is bonded and fixed to an inner face of the rear cabinet segment 2 with the adhesive tape 53. The speaker 4 is screwed and fixed to an inside of the cylindrical rib 22 of the rear cabinet segment 2 with the front face thereof in close contact with the dustproof net 51 of the dustproof plate 5.

In the above-described portable telephone, as shown in FIG. 5, the reinforcing sheet 52 is attached to the dustproof net 51 to provide the dustproof plate 5 having larger rigidity (resistance against bent deformation) as a whole than that of the dustproof net 51. Particularly, in the dustproof plate 5 of the present example shown in FIG. 6, although the four large openings 54 are formed in the reinforcing sheet 52, the cross arm portion 55 of the reinforcing sheet 52 gives high stiffness to the dustproof net 51. Therefore, the dustproof plate 5 hardly vibrates even if subjected to excitation force when the speaker 4 sounds, to thereby suppress occurrence of rattle sound.

Furthermore, according to the portable telephone of the present invention, when the dustproof plate 5 is placed inside the rear cabinet segment 2 in an assembly process thereof as shown in FIG. 4, the dustproof plate 5 with high stiffness is not easily bent deformed, and therefore easily attached to the rear cabinet segment 2.

The present invention is not limited to the foregoing embodiment in construction but can be modified variously by one skilled in the art without departing from the spirit of the present invention as set forth in the appended claims. For example, the reinforcing sheet 52 of the dustproof plate 5 is not limitedly in the shape shown in FIG. 6 but may be in various shapes that can give resistance against deformation of the dustproof net 51. Furthermore, the dustproof plate 5 is not limitedly placed in close contact with the front face of the speaker 4 but may be placed in close contact with the inner face of the rear cabinet segment 2.

What is claimed is:

1. A portable electronic device comprising:
    a cabinet;
    a speaker placed inside the cabinet, the cabinet having one or more sound radiating holes in an area opposed to a front face of the speaker; and
    a dustproof plate formed by attaching together a dustproof net to a reinforcing sheet, and placed on the front face of the speaker or an inner face of the cabinet opposed to the front face, the reinforcing sheet having a plurality of openings formed for passing through sound waves from the speaker;
    wherein a total area of the plurality of openings formed on the reinforcing sheet of the dustproof plate is larger than a total opening area of the one or more sound radiating holes provided in the cabinet.

2. The portable electronic device according to claim 1, wherein the reinforcing sheet is made of synthetic resin, and has the plurality of openings formed surrounding the middle thereof.

* * * * *